(12) United States Patent
Lufkin

(10) Patent No.: US 7,268,821 B2
(45) Date of Patent: Sep. 11, 2007

(54) UPCONVERSION WITH NOISE CONSTRAINED DIAGONAL ENHANCEMENT

(75) Inventor: John Kimball Lufkin, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 529 days.

(21) Appl. No.: 10/509,215

(22) PCT Filed: Mar. 19, 2003

(86) PCT No.: PCT/US03/08614

§ 371 (c)(1),
(2), (4) Date: Sep. 24, 2004

(87) PCT Pub. No.: WO03/084206

PCT Pub. Date: Oct. 9, 2003

(65) Prior Publication Data

US 2005/0225672 A1    Oct. 13, 2005

Related U.S. Application Data

(60) Provisional application No. 60/367,821, filed on Mar. 27, 2002.

(51) Int. Cl.
*H04N 7/01* (2006.01)
*H04N 11/20* (2006.01)
(52) U.S. Cl. .................... 348/448; 348/452; 348/451; 348/441; 348/619; 382/300; 382/272
(58) Field of Classification Search ............... 348/448, 348/441, 451, 452, 458, 619, 620, 625, 627, 348/421.1; 382/298, 299, 300, 266, 272
See application file for complete search history.

(56) References Cited

U.S. PATENT DOCUMENTS 4,967,263 A    10/1990    Dieterich (Continued)

FOREIGN PATENT DOCUMENTS

WO    WO 3084110 A2  *  10/2003

OTHER PUBLICATIONS

Search Report Dated Dec. 12, 2003.

(Continued)

*Primary Examiner*—David Ometz
*Assistant Examiner*—Jean W. Désir
(74) *Attorney, Agent, or Firm*—Joseph J. Laks; Harvey D. Fried

(57) ABSTRACT

A method of interpolating a given output pixel value when upconverting interlaced video to progressive video includes the step of determining averages for vertically adjacent pixels, left diagonally adjacent pixels, and right diagonally adjacent pixels respectively for the given output pixel and the step of determining differences between the vertically adjacent pixels, the left diagonally adjacent pixels, and the right diagonally adjacent pixels respectively. The method further selects as an interpolated value for the given output pixel among the averages based on a minimal difference of an absolute value among the differences respectively and further constrains the interpolated value to the value of the average of the vertically adjacent pixels if a value of the given output pixel is not between a range of values defined by adjacent pixels above and below the given output pixel or if the selected minimal difference is not unique.

15 Claims, 3 Drawing Sheets

U.S. PATENT DOCUMENTS

| | | | |
|---|---|---|---|
| 5,046,164 A * | 9/1991 | Hurst, Jr. | 348/448 |
| 5,093,721 A | 3/1992 | Rabii | |
| 5,128,747 A * | 7/1992 | Isnardi et al. | 348/470 |
| 5,347,599 A | 9/1994 | Yamashita et al. | |
| 5,386,237 A * | 1/1995 | Knee | 348/458 |
| 5,467,145 A * | 11/1995 | Limberg | 348/628 |
| 5,481,311 A | 1/1996 | Bole | |
| 5,663,771 A * | 9/1997 | Raby | 348/663 |
| 5,742,348 A * | 4/1998 | Kuwahara et al. | 348/441 |
| 5,796,437 A * | 8/1998 | Muraji et al. | 348/452 |
| 6,037,990 A * | 3/2000 | Ogawa et al. | 348/452 |
| 6,384,873 B1 * | 5/2002 | Rumreich et al. | 348/666 |
| 6,421,090 B1 * | 7/2002 | Jiang et al. | 348/452 |
| 6,452,639 B1 * | 9/2002 | Wagner et al. | 348/448 |
| 6,515,706 B1 | 2/2003 | Thompson et al. | |
| 6,573,941 B1 * | 6/2003 | Willis et al. | 348/448 |
| 6,650,790 B1 * | 11/2003 | Arbeiter et al. | 382/275 |
| 6,992,725 B2 * | 1/2006 | Mohsenian | 348/448 |
| 7,116,372 B2 * | 10/2006 | Kondo et al. | 348/448 |

OTHER PUBLICATIONS

Supplementary European Search Report Dated Mar. 26, 2007.

* cited by examiner

UPCONVERSION WITH NOISE CONSTRAINED DIAGONAL ENHANCEMENT

This application claims the benefit, under 35 U.S.C. § 365 of International Application PCT/US03/08614, filed Mar. 19, 2003, which was published in accordance with PCT Article 21(2) on Oct. 9, 2003 in English and which claims the benefit of U.S. Provisional patent application No. 60/367,821, filed Mar. 27, 2002.

BACKGROUND OF THE INVENTION

Technical Field

This invention relates to the field of upconverting interlaced video to progressive (non-interlaced) video. More particularly, this invention relates to the field of deinterlacing algorithms.

SUMMARY OF THE INVENTION

In accordance with the inventive arrangements, a noise constraint is added to the decision process of selecting between two diagonal averages and the vertical average, advantageously improving the picture quality in the areas where diagonal detail exists. This noise constraint causes the new algorithm, denoted DIAG1T, to prefer the vertical average in ambiguous cases.

More particularly, the DIAG1T algorithm advantageously prefers the vertical average under two conditions, representing further decision steps in addition to the DIAG1 average selection algorithm. Firstly, if the minimum difference is not unique, the vertical average is selected. Secondly, if the selected average does not lie in the range of values between the pixel above and the pixel below the position being interpolated, then the vertical average is selected.

The diagonal adjacent pixels line-up at angles in the displayed picture that correspond or depend upon on the sample rate. For a 720×480 picture with 4×3 aspect ratio, for example, the diagonals correspond to angles of about 41 degrees above horizontal. The improved algorithm can improve diagonal features in the picture that are steeper than this angle.

Figure 1:
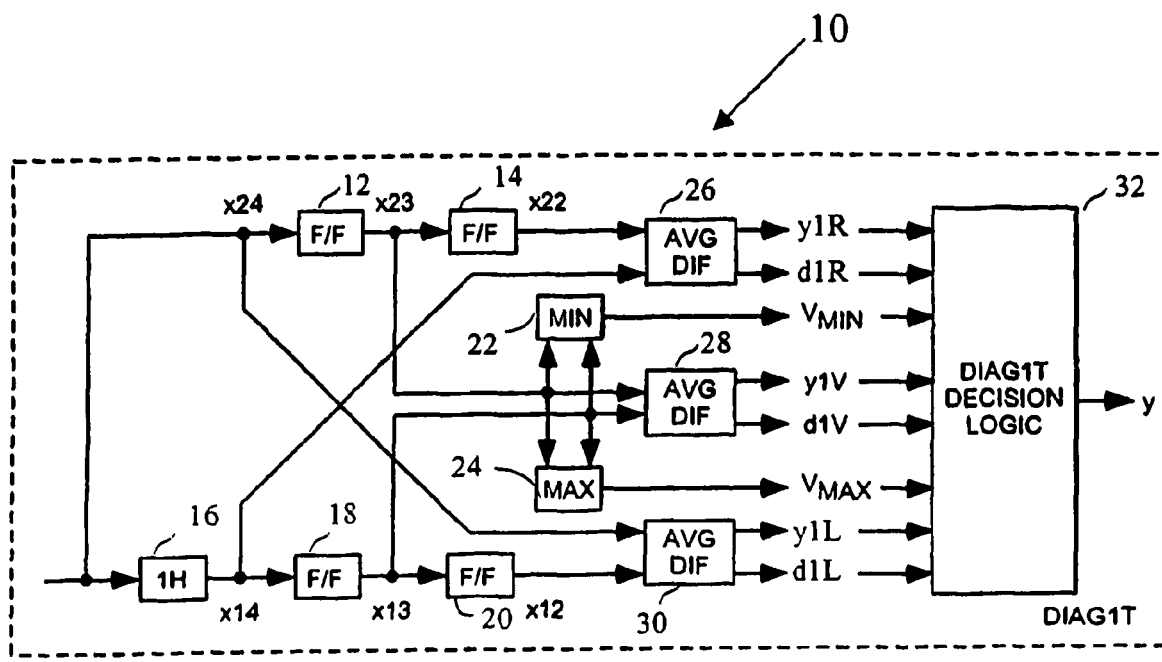
FIG. 1 is a block diagram of the DIAG1T diagonal enhancement upconversion system in accordance with the present invention.

When converting interlaced video to progressive scan format, a deinterlacing algorithm typically uses a temporal estimate (inter-field) in areas where no motion is detected, but uses a spatial estimate (intra-field) in motion areas. Spatial interpolation is used to generate an estimate for a missing line, based on the line above and below in the same field.

A simple method of deinterlacing a field of luminance pixels to create lines of pixels that are spatially in between the existing lines of the field is to average the values of the pixel directly above and below to create each new pixel. However, this method produces jagged edges on diagonal details in the field, such as on steps that are not horizontal or the on edges of the stripes on a flag as it waves in the wind and the angles vary.

A better method for enhanced diagonal detail, chooses between three pixel averages: the vertical average previously described and a left and right diagonal average. The left diagonal average is computed by averaging the value of the pixel to the left and above the position being interpolated with the pixel to the right and below. Likewise, the right diagonal is the average of the pixel to the right and above with the pixel to the left and below.

The basic idea of selecting between two diagonal averages and a vertical average was explored by the Sarnoff Research Laboratories (Sarnoff) in a research project funded by Thomson (assignee herein) in the early 1990's. The simplest algorithm choosing between the three choices was denoted in their report as the DIAG1 algorithm.

A simple algorithm to select one of these three averages was evaluated by Sarnoff and denoted DIAG1. The DIAG1 algorithm for selecting between two diagonal averages and a vertical average computes and compares three differences using the same pixel values as the averages. For each average, the corresponding difference is computed and the absolute values of those differences are compared to find a minimum. The pixel average that corresponds to the minimum difference is selected to be the interpolated value.

The Sarnoff work mentioned is documented in two reports: Spatially-Adaptive De-Interlacing Techniques for Digital Feature TV, Dec. 31, 1990 and Digital Feature TV Project Final Report, Mar. 31, 1991.

Even with the apparent advantage of having multiple choices to consider for a spatial interpolation estimate, the existing decision process of DIAG1 appears somewhat random and noisy because the minimum value is not always the best choice. There is a long-felt need for an improved decision process that is relatively simple and inexpensive to implement, but nevertheless is less random and noisy.

DETAILED DESCRIPTION OF THE PREFERRED EMBODIMENTS

The deinterlacing algorithm in accordance with the inventive arrangements is denoted herein as the DIAG1T. The DIAG1T deinterlacing algorithm can be used as a spatial only (intra-field) algorithm or as a spatial estimate in a motion adaptive deinterlacing algorithm. The improvement achieved by the DIAG1T algorithm, when used for the spatial estimate instead of a simple line average, is significant.

In the following description, it is assumed that the video signal is in component form and that only the luminance component is processed with the DIAG1T algorithm. Thus, a "luminance pixel value" or "pixel value" as used herein refers to the luminance component. A simple line average is satisfactory for deinterlacing the two lower resolution chrominance components.

Figure 2:
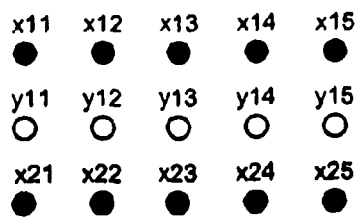
FIG. 2 is a diagram useful for explaining the spatial orientation of original and interpolated pixels.

Let the luminance pixel values on two consecutive lines of input video be labeled $X_{ij}$ and the interpolated progressive output line pixels be labeled $Y_{ij}$ as follows, and as shown in FIG. 2:

Input line 1: X11 X12 X13 X14 X15
Output line: Y11 Y12 Y13 Y14 Y15
Input line 2: X21 X22 X23 X24 X25

A simple line average spatial estimate would be:

$$Y1j=(X1j+X2j)/2.$$

The description of the DIAG1T algorithm given below will focus on computing the spatial estimate for the output position Y13. For other output pixels, the pixel indices in the description would be adjusted accordingly. An implementation of the algorithm can choose to modify the processing described herein at the beginnings and ends of lines when required pixels are not available.

For Y13, the DIAG1T algorithm computes 3 pixel averages and 3 pixel differences as follows, and as shown in FIG. 1:

$$y1L=(X12+X24)/2;\ d1L=abs(X12-X24);$$

$$y1V=(X13+X23)/2;\ d1V=abs(X13-X23);$$

$$y1R=(X14+X22)/2;\ d1R=abs(X14-X22).$$

Figure 3:
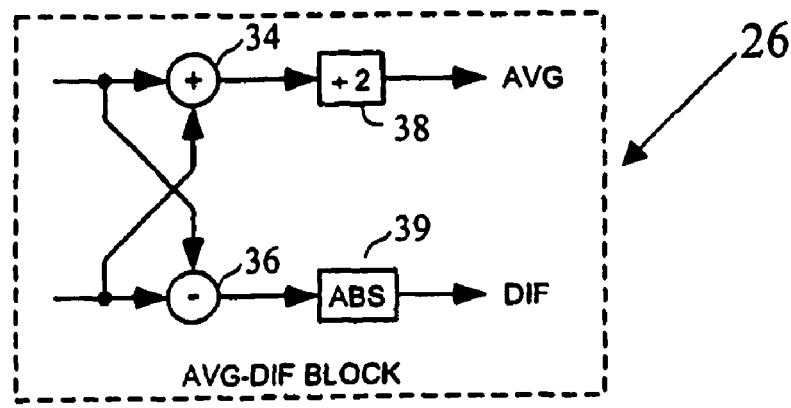
FIG. 3 is a block diagram illustrating the details of the Averaging and Difference (AVG-DIF) blocks in FIG. 1.

These averages and differences correspond to a left diagonal, a vertical and a right diagonal estimate. An exemplary block diagram of a circuit 10 for providing all these averages and differences is shown in FIG. 1 including a plurality of delay circuits 12, 14, 16,18, and 20 in the form of flip flops and other suitable devices. For example, delay circuit 16 can be a line delay. The circuit further includes minimum circuit 22, maximum circuit 24, as well as AVG-DIFF blocks 26, 28 and 30. The details of an exemplary AVG-DIF block such as the AVG-DIF block 26 in FIG. 1 is shown in FIG. 3. AVG-DIF block 26 preferably includes in an averaging portion of the device or block, a summer 34 for adding adjacent pixel values and a divide-by-two circuit 38. In a difference portion, block 26 further includes a subtractor 26 and an absolute value function 39.

Figure 5:
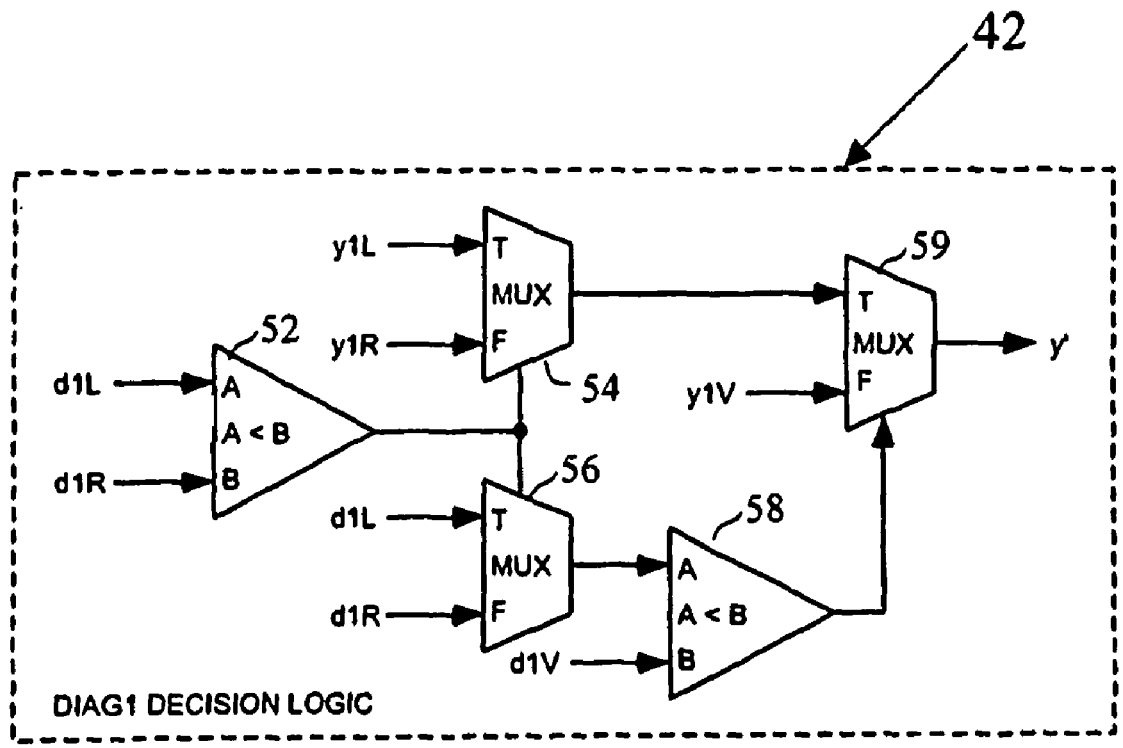
FIG. 5 is a block diagram of the DIAG1 decision logic shown in FIG. 4.

The basic DIAG1 algorithm chooses the estimate that corresponds to the minimum difference as follows, and as shown in FIG. 5:

$$y=y1V;\ d=d1V;$$

$$\text{if } (d1L<d)\ \{y=y1L;\ d=d1L;\}$$

$$\text{if}(d1R<d)\ y=y1R;$$

$$Y13=y;$$

More specifically, the basic DIAG1 decision logic 42 can be represented using comparators 52 and 58 and multiplexers 54, 56 and 59 coupled as shown in FIG. 5 to provide the functionality of the DIAG1 algorithm described above, although the present invention is not limited thereto. Note that the DIAG1 algorithm or DIAG1 decision logic 42 forms a part of the overall DIAG1T decision logic 32 shown in FIGS. 1 and 4.

Figure 4:
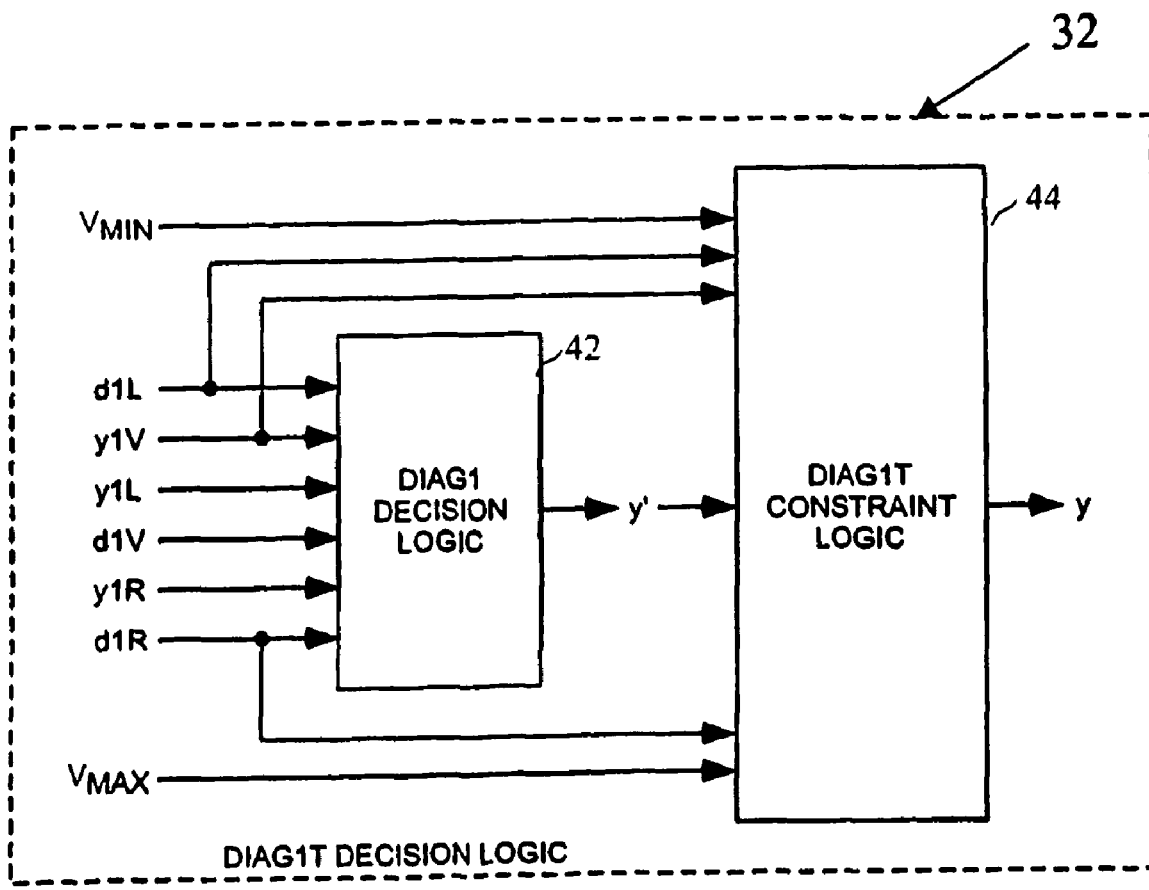
FIG. 4 is a block diagram illustrating the signal flow in the DIAG1T circuit shown in FIG. 1.
Figure 6:
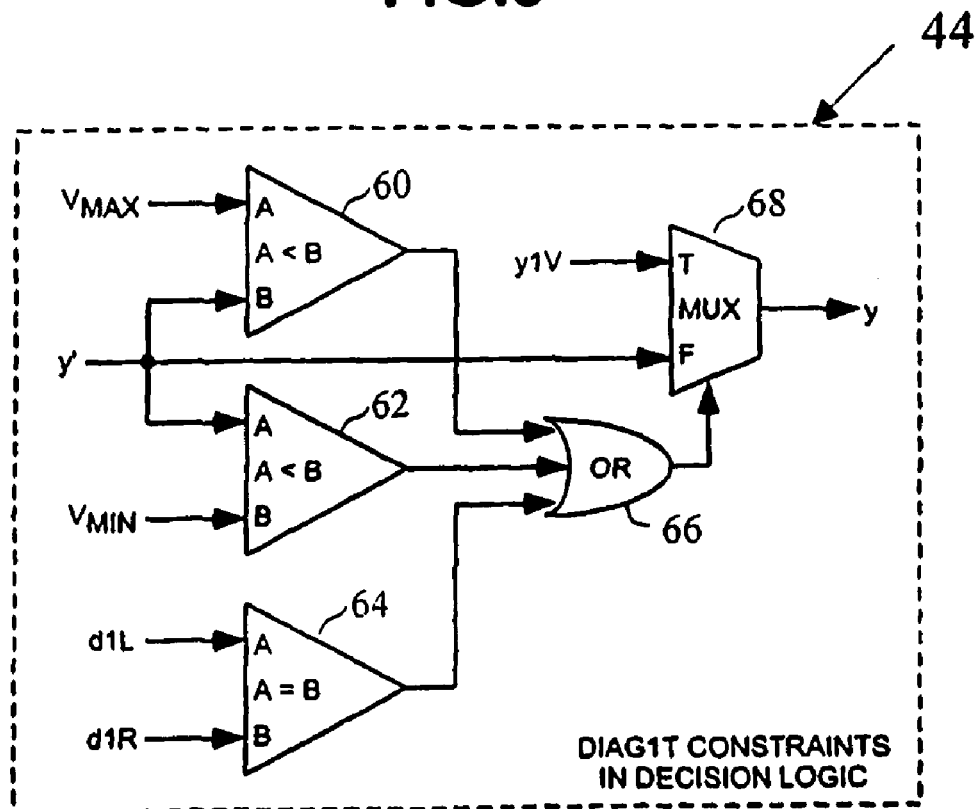
FIG. 6 is a block diagram illustrating the DIAG1T constraint logic in FIG. 4.

The noise constraint or the DIAG1T constraint logic 44 shown in FIGS. 4 and 6 that is used to clean up decision noise in DIAG1, and in so doing distinguish DIAG1T over DIAG1, further insists that a value for the given output pixel (Y13) fall within a range of values of a top pixel and a bottom pixel defining the vertical average for the given output pixel. In terms of equations, this means that either:

$$X13 \leq Y13 \leq X23 \text{ or } X13 \geq Y13 \geq X23$$

If this constraint is not satisfied, then output Y13=y1V.

An additional constraint distinguishing DIAG1T is that the left diagonal difference either equals or substantially equals the right diagonal difference. In other words, the differences for the left diagonally adjacent pixels and the right diagonally adjacent pixels need to be unique or d1R must differ from d1L. In terms of equations:

$$\text{if } d1L=d1R, \text{ then output } Y13=y1V.$$

These further constraints are illustrated in FIGS. 4 and 6. In particular, the DIAG1T constraint logic 44 shown in FIG. 6 can be embodied by comparators 60, 62, and 64, OR gate 66 and multiplexer 68 arranged and coupled as shown to provide the functions described above.

Thomson's Princeton Engine real time digital video simulator was programmed to demonstrate Sarnoff's DIAG1, DIAG3 and DIAG3W deinterlacing algorithms and Thomson's new DIAG1T deinterlacing algorithm. The Princeton Engine was programmed to perform each DIAG algorithm as a spatial only (intra-field) deinterlacer and also as the spatial estimate of a motion adaptive deinterlacing algorithm.

The algorithms were simulated and demonstrated to various observers first with a fixed test pattern, the frame rate sweep, and then with frozen video scenes and finally with real time motion video.

In a frame rate sweep test pattern, a wide variety of horizontal, vertical and diagonal frequencies exist. All of the Sarnoff deinterlacing algorithms cause the deinterlaced test pattern to appear to have various regions defined by visible boundaries where some regions were estimated by the vertical average, and other regions by the left or right diagonal average. The main observable difference between the four algorithms DIAG1, DIAG3, DIAG3W and DIAG1T is the nature of the boundaries between the regions. When the frame rate sweep pattern is digitally generated, the boundaries are very clean and straight. However, when the test pattern is from an analog source with some noise, the boundaries are less well defined and jagged. With DIAG3W and DIAG1T the boundaries are noticeably cleaner. DIAG3 provides some improvement over DIAG1. There is little difference between the appearance of DIAG3W and DIAG1T but the DIAG1T algorithm is much less complex and much easier to implement than DIAG3W. The region boundaries are significantly cleaner with the DIAG1T algorithm than with the DIAG1 algorithm.

In simulations with frozen or moving video, areas with diagonal detail are visibly improved. One such scene observed had an American flag waving in the wind. The stripes on the flag change from horizontal to various angles of diagonal as the flag moves in the wind and had visibly improved detail in such areas with diagonal detail. The improvement of jagged edges on some of the diagonal angles was significant.

When used as the spatial estimate of a motion adaptive algorithm, the DIAG1T algorithm significantly improves moving areas of the picture without significantly adding complexity or cost. Stationary regions of the picture already have superior detail from adjacent fields of the video.

In light of the foregoing description of the invention, it should be recognized that the present invention can be realized in hardware, software, or a combination of hardware and software. A method of interpolating a given output pixel value when upconverting interlaced video to progressive video according to the present invention can be realized in a centralized fashion in one processing system, or in a distributed fashion where different elements are spread across several interconnected systems. Any kind of computer system, or other apparatus adapted for carrying out the methods described herein, is suited. A typical combination of hardware and software could be a general purpose computer processor or digital signal processor with a computer program that, when being loaded and executed, controls the computer system such that it carries out the methods described herein.

The present invention can also be embedded in a computer program product, which comprises all the features enabling the implementation of the methods described herein, and which, when loaded in a computer system, is able to carry out these methods. Computer program or application in the present context means any expression, in any language, code or notation, of a set of instructions intended to cause a system having an information processing capability to perform a particular function either directly or after either or both of the following a) conversion to another language, code or notation; b) reproduction in a different material form.

Additionally, the description above is intended by way of example only and is not intended to limit the present invention in any way, except as set forth in the following claims.

What is claimed is:

1. A method for upconverting interlaced video to progressive video with a noise constrained diagonal enhancement, comprising the steps of:

determining, for a given output pixel, a vertical average, a left diagonal average, a right diagonal average, a vertical difference, a left diagonal difference and a right diagonal difference;

selecting among the vertical average, the left diagonal average and the right diagonal average based on a minimal difference among the vertical difference, the left diagonal difference and the right diagonal difference; and, constraining the selecting step to the vertical average if the left diagonal difference substantially equals the right diagonal difference.

2. The method of claim 1, wherein the method further comprises the step of constraining the selecting step to the vertical average if a value for the given output pixel is not between a range of values of a top pixel and a bottom pixel defining the vertical average for the given output pixel.

3. The method of claim 1, wherein the method further comprises the step of constraining the selection step to the vertical average if a value for the given output pixel is not between a range of values defined by an adjacent pixel above the given output pixel and an adjacent pixel below the given output pixel.

4. The method of claim 1, wherein the vertical average is a obtained by adding a luminance component value of a vertically adjacent pixel above the given output pixel with a luminance component value of a vertically adjacent pixel below the given output pixel to form a sum which is divided by two.

5. The method of claim 1, wherein the left diagonal average is obtained by adding a luminance component value of a diagonally adjacent pixel above and to the left of the given output pixel with a luminance component value of a diagonally adjacent pixel below and to the right of the given output pixel to form a sum which is divided by two.

6. The method of claim 1, wherein the right diagonal average is obtained by adding a luminance component value of a diagonally adjacent pixel above and to the right of the given output pixel with a luminance component value of a diagonally adjacent pixel below and to the left of the given output pixel to form a sum which is divided by two.

7. The method of claim 1, wherein the minimal difference among the vertical difference, the left diagonal difference and the right diagonal difference is determined by comparing absolute values of the vertical difference, the left diagonal difference and the right diagonal difference and selecting a minimum among the vertical difference, the left diagonal difference and the right diagonal difference.

8. The method of claim 1, wherein the step of constraining comprises constraining the selection step to the vertical average if the left diagonal difference equals the right diagonal difference.

9. The method of claim 1, wherein:

the vertical average is based on vertically adjacent pixels;
   the left average is based on upper left and lower right diagonally adjacent pixels; and,
   the right average is based on upper right and lower left diagonally adjacent pixels.

10. The method of claim 9, wherein the step of selecting as an interpolated value for the given output pixel among the averages for the vertically adjacent pixels, the left diagonally adjacent pixels, and the right diagonally adjacent pixels is based on a minimal difference of an absolute value among the differences for the vertically adjacent pixels, the left diagonally adjacent pixels, and the right diagonally adjacent pixels respectively.

11. A deinterlacing circuit for upconverting interlaced video to progressive video, comprising:

means for determining, for a given output pixel, a vertical average, a left diagonal average, a right diagonal average, a vertical difference, a left diagonal difference and a right diagonal difference;

means for selecting among the vertical average, the left diagonal average and the right diagonal average based on a minimal difference among the vertical difference, the left diagonal difference and the right diagonal difference; and, means for constraining the selecting step to the vertical average if the minimal difference is ambiguous.

12. The deinterlacing circuit of claim 11, wherein the minimal difference among the vertical difference, the left diagonal difference and the right diagonal difference is ambiguous if a value for the given output pixel is not between a range of values defined by an adjacent pixel above the given output pixel and an adjacent pixel below the given output pixel.

13. The deinterlacing circuit of claim 11, wherein the minimal difference among the vertical difference, the left diagonal difference and the right diagonal difference is ambiguous if the average values for the left diagonally adjacent pixels and the right diagonally adjacent pixels are substantially equal.

14. The deinterlacing circuit of claim 11, wherein the determining, selecting and constraining means implement only a spatial deinterlacing.

15. The deinterlacing circuit of claim 11, wherein the determining, selecting and constraining means implement a spatial estimate of a motion adaptive deinterlacing algorithm.

* * * * *